United States Patent Office 3,431,236
Patented Mar. 4, 1969

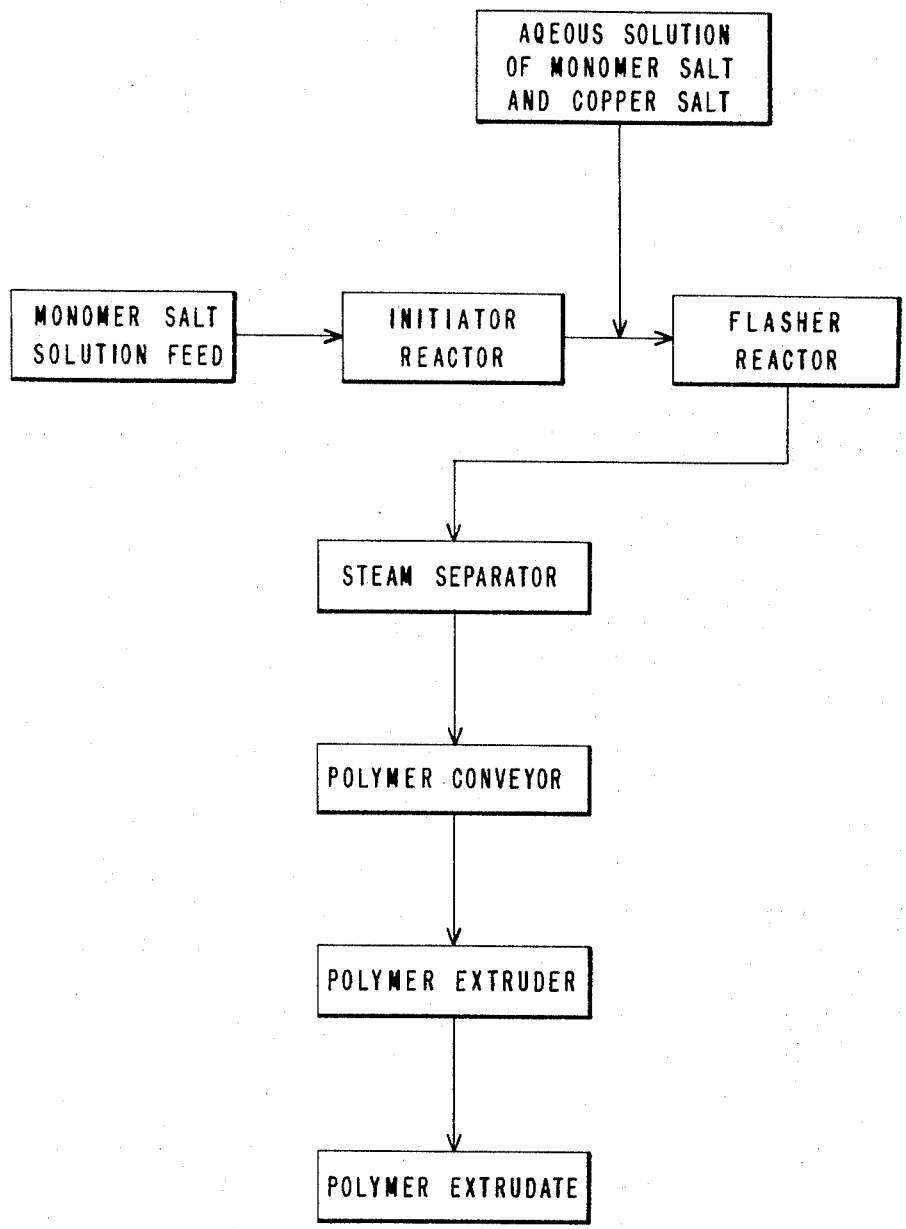

3,431,236
METHOD OF ADDING AN ANTIOXIDANT TO A CONTINUOUS POLYMERIZATION PROCESS
Buell Edward Davenport, John Henry Flynn IV, and Alfred Jacobs, Chattanooga, Tenn., assignors to E. I. du Pont de Nemours and Company, Wilmington, Del., a corporation of Delaware
Filed Jan. 13, 1966, Ser. No. 520,326
U.S. Cl. 260—45.75   4 Claims
Int. Cl. C08g 20/24, 51/62

ABSTRACT OF THE DISCLOSURE

Injection of copper salt antioxidants just prior to the flasher in a continuous polymerization process yields a polyamide and yarn produced therefrom which exhibit high uniformity of copper content. The copper compound is injected in a nylon salt solution which comprises from 0.03% to about 1.0% by weight of the copper salt based on the total weight of the solution. The monomer to copper ratio must be from about 0.5:1 to about 16:1 inclusive. This process is used for the production of polycarbonamide yarns which are subjected to conditions where oxidation is an important factor in yarn degradation.

---

This invention relates to the stabilization of synthetic linear polyamides against degradation at elevated temperatures.

Synthetic linear polyamides are well known for their outstanding properties in many end uses such as in textile fibers and molded articles of various types. In recent years, melt-spun polyamide yarns have come into widespread use in the reinforcement of pneumatic tires for automobiles and other vehicles. In this, as well as in other end uses, polyamides are often subjected to high temperatures for extended periods of time. Under such conditions, the polyamide tends to lose strength and become brittle unless a suitable stabilizing agent is added. Copper compounds, such as copper acetate, have been widely used alone and in combination with other ingredients for this purpose. The use of copper compounds in combination with inorganic halides such as potassium iodide for the stabilization of polyamides against degradation by heat is taught by Stamatoff in U.S. 2,705,227. The addition of such stabilizers is most easily accomplished by addition to the monomer, e.g., to the salt of a diamine and dibasic acid, before polymerization. While this procedure has proved satisfactory in batch preparation of polymers difficulties are encountered when this method of addition is employed in continuous preparation of a polyamide.

In continuous preparation of polyamides, e.g., as taught by Taylor in U.S. 2,361,717, when the copper compound is added to the monomer, the copper concentration in the final polymer fluctuates widely and cannot be controlled within reasonable limits. This variation in copper concentration is even greater when phosphinate compounds such as the sodium or hexamethylenediamine salt of phenylphosphinic acid are also added to the salt solution to inhibit yellowing or improve dye absorption.

In accordance with the present invention, it has been found that polyamides of improved uniformity with respect to copper antioxidant may be prepared from diamines and dibasic acids in a continuous melt polymerization process wherein the monomer salt is subjected to the two consecutive and adjacent steps of (1) partial polymerization at amidation pressure and temperature in a first reaction zone and (2) continuation of polymerization in a second zone at amidation temperature and at a pressure less than the pressure of the first zone with removal of steam in the second zone, by continuously adding to the low molecular weight polyamide, at a point after the initial high pressure reaction in the first zone has been substantially completed but before removal of water from the polymer in substantial quantity in the second step, a mixture of an aqueous solution of a copper salt and the salt of the dibasic acid and diamine used to prepare the polymer. The aqueous mixture contains at least 0.5 moles of monomer salt per mole of copper salt and preferably 0.5–16 moles of monomer salt per mole of copper salt, the optimum ratio being about 8 moles of monomer salt per mole of copper salt. The concentration of copper salt in the aqueous mixture should be in the range of from about 0.03 to about 1.0% by weight. Suitable copper salts for use in this invention include cupric acetate, cupric chloride, cupric lactate, cupric salicylate and the like.

The invention will be more readily understood by reference to the figure, which is a flow sheet of a typical continuous process polyamidation by the melt polymerization technique. As can be seen from the drawing, the aqueous solution of monomer salt and copper salt is most conveniently introduced between the high temperature, high pressure initiator reactor where polyamidation begins and the flasher reactor where pressure is dropped and polyamidation promoted by removal of water in the form of steam.

The process of this invention permits continuous injection of the copper to yield a stabilized polymer of improved uniformity with regard to copper content, even when phosphinate compounds are added to the salt prior to the polymerization. Also surprisingly, it is found that the stabilized polyamide prepared by this process has a lower spherulite content than when the copper is added to the salt solution prior to polymerization.

Mixing of the copper compound with the salt of the dibasic acid and diamine prior to addition to the polymer is necessary to maintain a continuous injection process. Failure to add the salt results in plugging of the injection port.

It is usually desirable to add an inorganic iodide such as sodium, potassium, or lithium iodide to the polymer to enhance the stabilizing action of the copper. This may be done in the customary fashion by addition to the salt prior to polymerization.

The following example is cited to illustrate the invention. It is not intended to limit it in any manner.

Example

Polyhexamethylene adipamide is prepared in a continuous process following the general procedure described in copending U.S. application Ser. No. 345,042, filed Feb. 14, 1964, in the name of James C. Bryan. The procedure of that application follows the flow sheet described above, the polymer conveyor being a jacketed transfer system of pipes to allow sufficient time for the moving polymer stream to come to chemical equilibrium with any water content therein, while avoiding thermal degradation. This pipe system is designated an equilibration system in the application. An aqueous solution of hexamethylenediammonium adipate containing 49% of the salt and containing 0.10% of potassium iodide and 0.25% of the hexamethylenediamine salt of phenylphosphinic acid is fed continuously to a reactor where it is heated to a temperature of 213–231° C. and a pressure of about 17 atmospheres. Low molecular weight polymer from the reactor is fed into a second reaction zone where the pressure is gradually reduced to atmospheric. Just before the low molecular weight polyamide enters the second reaction zone, an aqueous mixture containing 0.08% by weight of copper, and prepared by adding an aqueous solution of copper acetate to an aqueous solution containing sufficient hexamethylenediammonium adipate to provide 8 moles of hexamethylenediammonium adipate per mole of copper, is added continuously to the polyamide in sufficient amount to provide a concentration of 70–80 p.p.m. of copper in the final polymer. After the polymer passes through the second reaction zone, sometimes referred to as the flasher, it passes to a steam separator and then into an equilibration system where the polymer reaches the molecular weight desired for extrusion. The polymer is then extruded in the conventional manner to produce a multifilament yarn. Operating in this fashion over a prolonged period of time, the variation in copper concentration in the polymer is found to be about ±15% and there is no problem with the continuous injection of the copper compound. By comparison, when the copper acetate is added to the salt solution prior to polymerization, the copper concentration is erratic and varies uncontrollably by a factor of 3 to 4. Also for comparison, when the copper is injected just prior to the second reaction zone but as an aqueous solution of copper acetate, the injection port is plugged after 13 hours or less.

As shown in the foregoing example, the addition of the copper stabilizer in accordance with this invention results in a polymer of improved uniformity with respect to copper concentration. Also, loss of copper in the processing equipment is considerably minimized by this procedure.

The amount of copper to be added to the polymer may vary considerably depending on the polyamide and on the end use for which it is destined; however, for most purposes the copper concentration should be in the range of 30–150 p.p.m. Where an inorganic iodide is employed, a concentration of 0.1–2.0% is usually satisfactory. The preferred iodides are the alkali metal iodides.

The aqueous stabilizer mixture to be added to the polymer should be fairly dilute in order to provide adequate regulation of the concentration in the polymer. As indicated previously, the concentration should be in the range of 0.03–1.0% by weight based on the weight of the solution and, for most purposes, the optimum range is 0.05–0.12%.

The process of this invention is suitable for the preparation of polyamides derived from the reaction of diamines with dicarboxylic acids or their amide-forming derivatives. Among the polyamides which may be suitably prepared by the process of this invention are those disclosed in U.S. Patent No. 2,130,523. Interpolyamides prepared from mixtures of diamines, dibasic acids, and amino acids can also be used for the practice of this invention. Likewise, melt blends of two or more polyamides can be used if desired. In general, the range of polyamides which may be heat stabilized which are adapted for use as reinforcement material or for the purposes is well known.

Many equivalent modifications will be apparent to those skilled in the art from a reading of the above without a departure from the inventive concept.

What is claimed is:

1. In a continuous system for producing a polyamide by a melt polymerization in which an aqueous solution of a monomer salt is subjected to the two consecutive and adjacent steps of (1) partial polymerization at amidation pressure and temperature in a first reaction zone and (2) continuation of polymerization in a second zone at amidation temperature and at a pressure less than the pressure of the first said zone with removal of steam in the second said zone, the improvement comprising continuously introducing immediately prior to the second said zone, a composition of matter comprising an aqueous solution containing a mixture of the said monomer salt and from about 0.03 to about 1.0% by weight of a copper salt, the molar ratio of the said salts of monomer:copper being between about 0.5:1 and about 16:1 inclusive, and the said composition being fed at a rate to provide a copper salt concentration in the polyamide of from about 30 to about 150 parts per million.

2. The process of claim 1 wherein the said monomer salt is formed from hexamethylenediamine and adipic acid.

3. The process of claim 2 wherein the said copper salt is a member of the class consisting of cupric acetate, cupric chloride, cupric lactate, and cupric salicylate.

4. The process of claim 2 wherein the said copper salt is cupric acetate.

References Cited

UNITED STATES PATENTS 2,705,227    1955    Stamatoff _____ 260—45.7

FOREIGN PATENTS 908,647    10/1962    Great Britain.

DONALD E. CZAJA, *Primary Examiner.*

V. P. HOKE, *Assistant Examiner.*

U.S. Cl. X.R.

260—29.2, 78